(12) United States Patent
Peric et al.

(10) Patent No.: US 7,644,732 B2
(45) Date of Patent: Jan. 12, 2010

(54) SLIDE-IN FLAPPER VALVES

(75) Inventors: Yuri Peric, Oakville (CA); Brian E. Cheadle, Brampton (CA)

(73) Assignee: Dana Canada Corporation, Oakville, Ontario (CA)

( * ) Notice: Subject to any disclaimer, the term of this patent is extended or adjusted under 35 U.S.C. 154(b) by 551 days.

(21) Appl. No.: 11/110,029

(22) Filed: Apr. 20, 2005

(65) Prior Publication Data
US 2006/0237077 A1 Oct. 26, 2006

(51) Int. Cl.
*F16K 15/16* (2006.01)
(52) U.S. Cl. .................. 137/855; 165/280; 165/284; 165/916
(58) Field of Classification Search .......... 137/855, 137/856, 857, 858; 165/280, 283, 284, 297, 165/916, 167
See application file for complete search history.

(56) References Cited

U.S. PATENT DOCUMENTS

| | | | |
|---|---|---|---|
| 1,690,501 A | 11/1928 | Potts | |
| 1,860,163 A | 5/1932 | Wyzenbeek | |
| 2,698,063 A | 12/1954 | Brubaker | |
| 2,826,448 A | 3/1958 | Jones | |
| 3,289,693 A | 12/1966 | Scaramucci | |
| 3,568,712 A * | 3/1971 | Rinehart | 137/855 |
| 3,621,868 A | 11/1971 | Wise | |
| 3,949,716 A | 4/1976 | Liu | |
| 3,990,604 A | 11/1976 | Barnett et al. | |
| 3,998,243 A * | 12/1976 | Osterkorn et al. | 137/856 |
| 3,998,571 A | 12/1976 | Falke | |
| 4,179,051 A | 12/1979 | Thomas | |
| 4,193,442 A | 3/1980 | Vian | |
| 4,199,309 A | 4/1980 | Connor | |
| 4,337,737 A | 7/1982 | Pechner | |
| 4,360,055 A * | 11/1982 | Frost | 165/283 |
| 4,373,561 A | 2/1983 | Berger | |
| 4,425,067 A | 1/1984 | Krezak | |
| 4,471,804 A | 9/1984 | Bauer et al. | |
| 4,561,494 A * | 12/1985 | Frost | 165/76 |
| 4,669,532 A * | 6/1987 | Tejima et al. | 165/297 |
| 4,871,013 A | 10/1989 | Nilsson et al. | |
| 5,078,209 A | 1/1992 | Kerkman et al. | |

(Continued)

FOREIGN PATENT DOCUMENTS

CA 1005319 2/1977

(Continued)

OTHER PUBLICATIONS

U.S. Appl. No. 11/110,409 (Peric) entitled Tubular Flapper Valves filed Apr. 20, 2005.

(Continued)

*Primary Examiner*—Craig M Schneider
(74) *Attorney, Agent, or Firm*—Ridout & Maybee LLP

(57) ABSTRACT

A flapper valve assembly attaches to a fluid device, such as a heat exchanger and has a fluid port in communication with the fluid device to provide by-pass flow in cold flow or pressure spike conditions. The flapper valve assembly includes a shim plate and a face plate that together define a slot therebetween. A spring flapper slides into the slot and is retained therein and intermittently blocks flow through the fluid port to provide the by-pass flow when required.

11 Claims, 14 Drawing Sheets

U.S. PATENT DOCUMENTS

| | | | |
|---|---|---|---|
| 5,146,980 A * | 9/1992 | Le Gauyer | 165/167 |
| 5,174,504 A | 12/1992 | Halvorsen | |
| 5,236,043 A | 8/1993 | Armbruster | |
| 5,266,016 A | 11/1993 | Kandpal | |
| 5,273,385 A | 12/1993 | Rose | |
| 5,351,664 A | 10/1994 | Rotter et al. | |
| 5,380,176 A | 1/1995 | Kikuchi et al. | |
| 5,411,057 A | 5/1995 | Pouchot | |
| 5,499,675 A * | 3/1996 | Haasch et al. | 165/103 |
| 5,544,699 A * | 8/1996 | Robers et al. | 165/283 |
| 5,558,346 A | 9/1996 | Hartery | |
| 5,575,329 A | 11/1996 | So et al. | |
| 5,588,485 A * | 12/1996 | Gire | 165/157 |
| 5,595,214 A | 1/1997 | Shaffer et al. | |
| 5,609,476 A * | 3/1997 | Kim et al. | 417/447 |
| 5,765,632 A * | 6/1998 | Gire | 165/167 |
| 5,921,273 A | 7/1999 | Ono et al. | |
| 5,950,589 A | 9/1999 | Armbruster | |
| 6,139,291 A * | 10/2000 | Perevozchikov | 418/55.1 |
| 6,293,774 B1 * | 9/2001 | Brabek | 417/569 |
| 6,298,910 B1 | 10/2001 | Komoda et al. | |
| 6,358,024 B1 | 3/2002 | Djordjevic | |
| 6,382,305 B1 | 5/2002 | Sano | |
| 6,412,514 B1 | 7/2002 | Raftis | |
| 6,427,768 B2 | 8/2002 | Komoda et al. | |
| 6,460,613 B2 | 10/2002 | Nash et al. | |
| 6,461,126 B1 | 10/2002 | Pierobon | |
| 6,471,490 B2 | 10/2002 | Kimura et al. | |
| 6,814,133 B2 | 11/2004 | Yamaguchi | |
| 6,942,472 B2 | 9/2005 | Sieberg | |
| 2003/0019620 A1 | 1/2003 | Pineo et al. | |
| 2006/0102240 A1 | 5/2006 | Spiegl et al. | |

FOREIGN PATENT DOCUMENTS

| | | |
|---|---|---|
| CA | 1102210 | 6/1981 |
| CA | 1122968 | 5/1982 |
| GB | 1 545 710 | 5/1979 |
| WO | WO 2005/048890 | 6/2005 |

OTHER PUBLICATIONS

U.S. Appl. No. 11/110,434 (Cheadle et al) entitled Self-Riveting Flapper Valves filed Apr. 20, 2005.

U.S. Appl. No. 11/110,410 (Peric et al) entitled Flapper Valves With Spring Tabs filed Apr. 20, 2005.

U.S. Appl. No. 11/110,433 (Peric) entitled Snap-In Flapper Valve Assembly filed Apr. 20, 2005.

U.S. Appl. No. 11/110,288 (Peric et al) entitled Snap-In Baffle Insert for Fluid Devices filed Apr. 20, 2005.

* cited by examiner

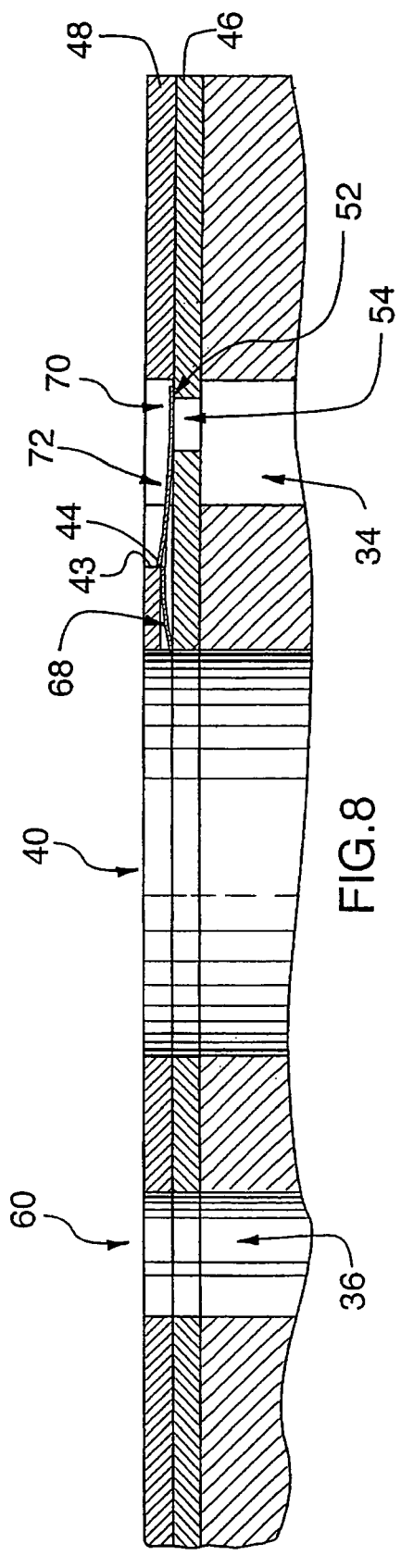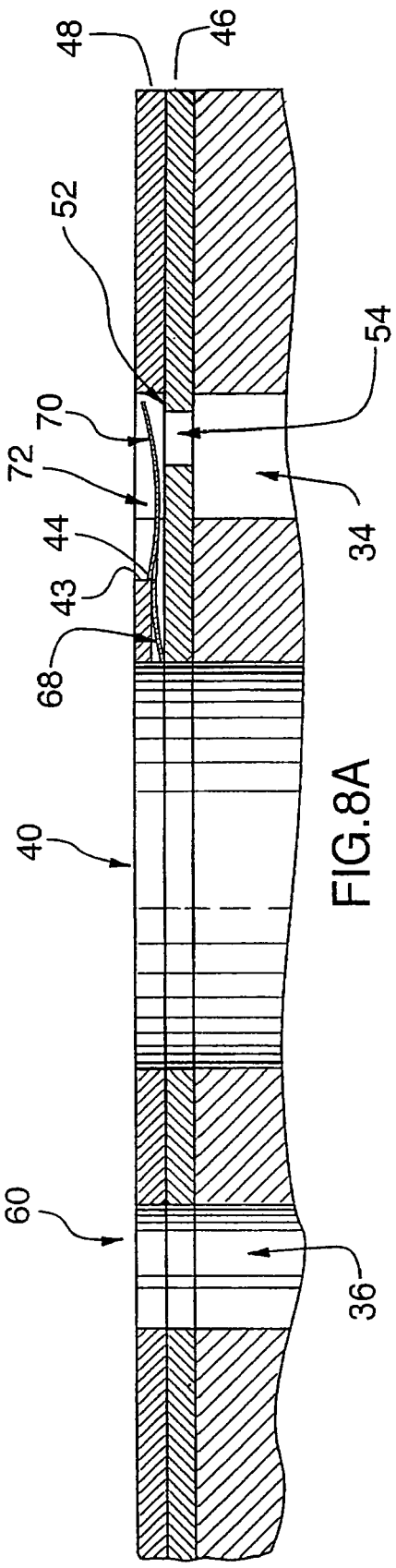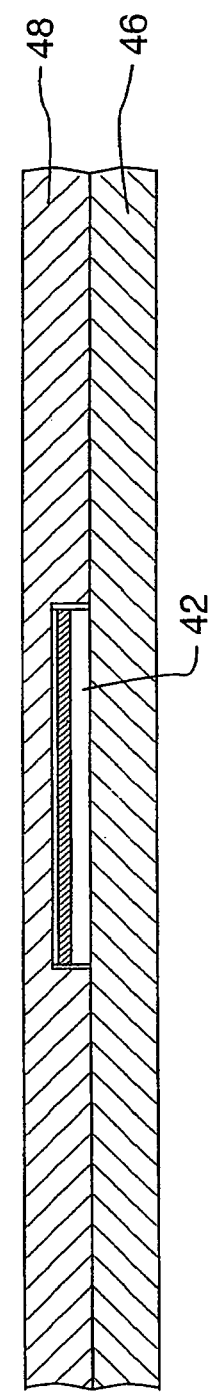

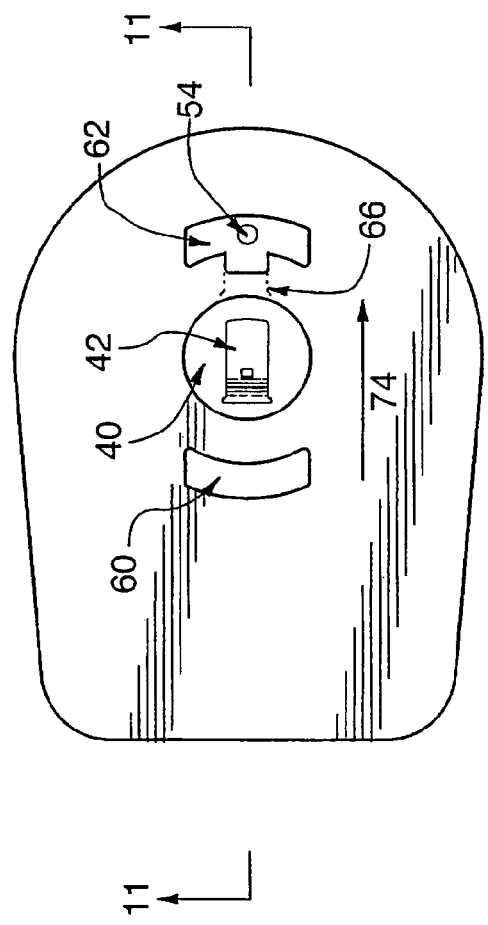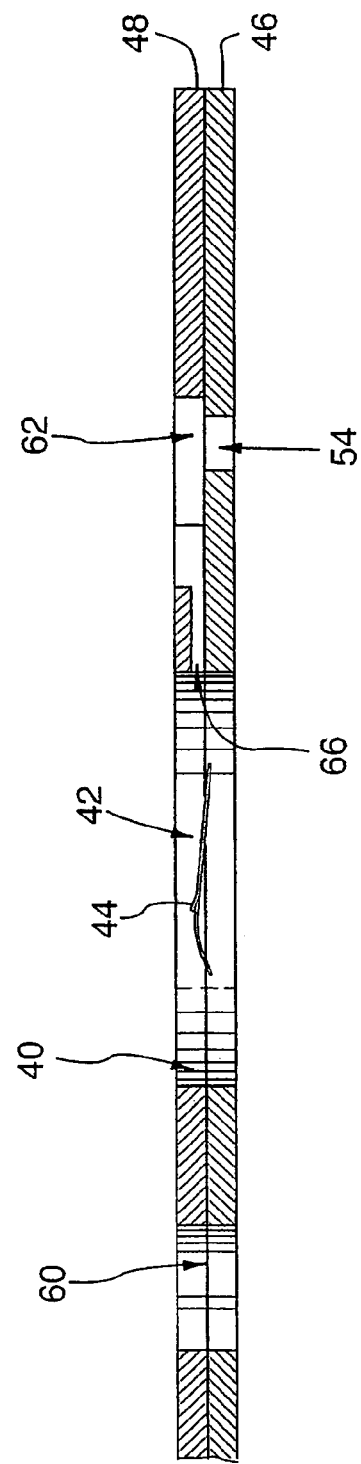
FIG.10
FIG.11

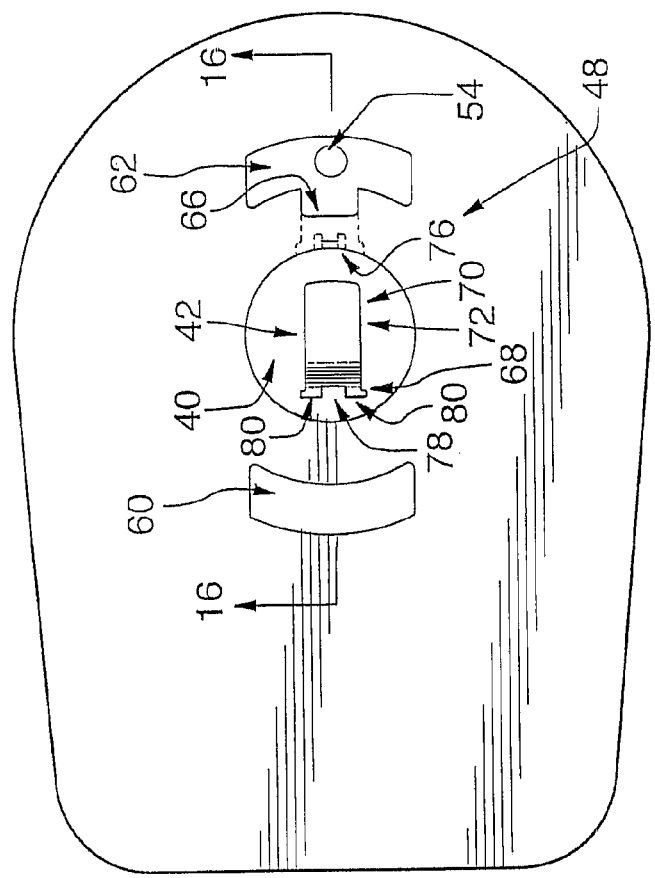
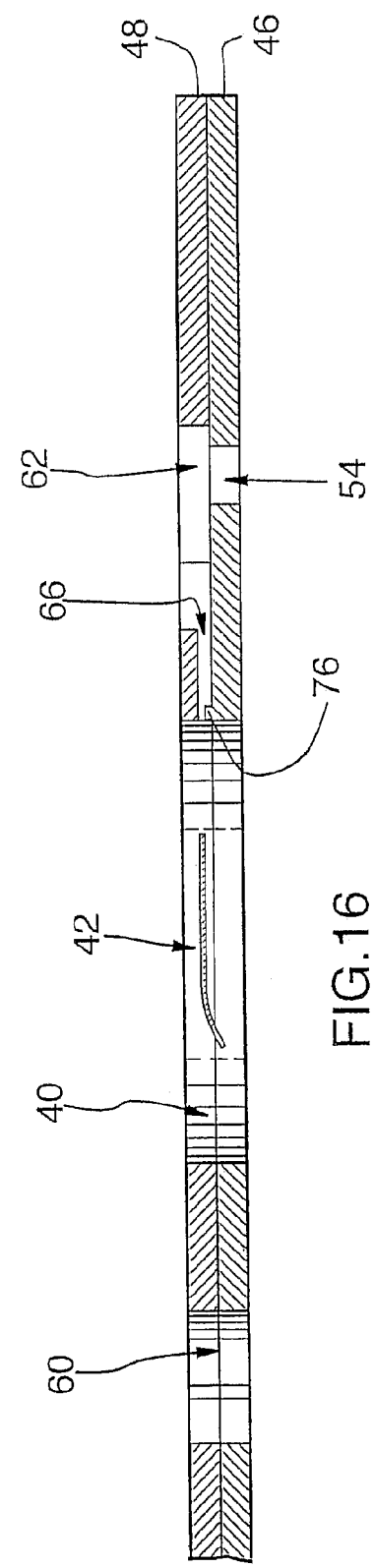
FIG.15
FIG.16

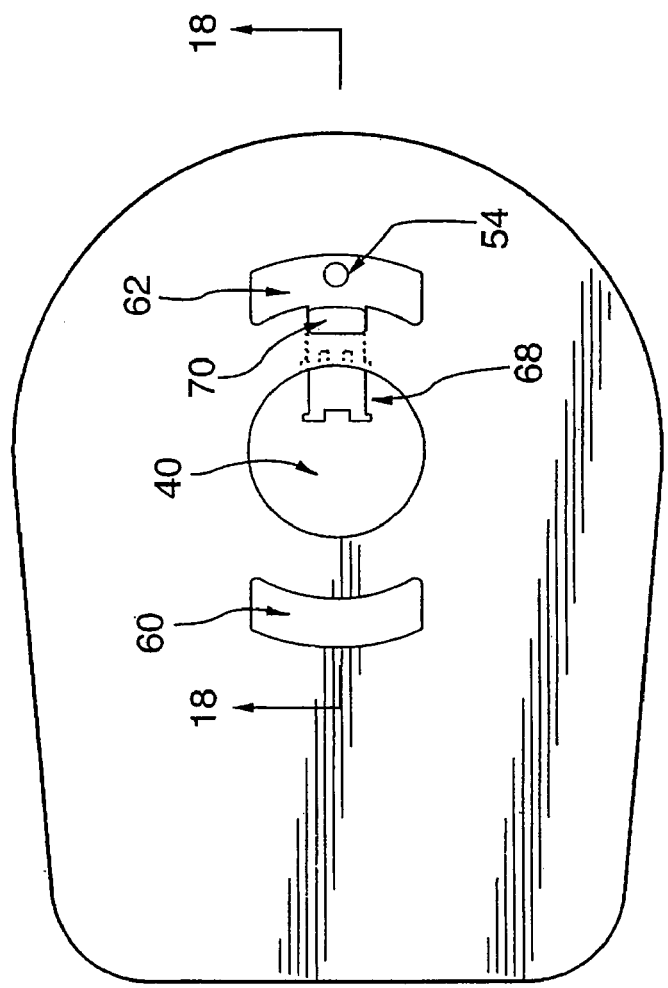
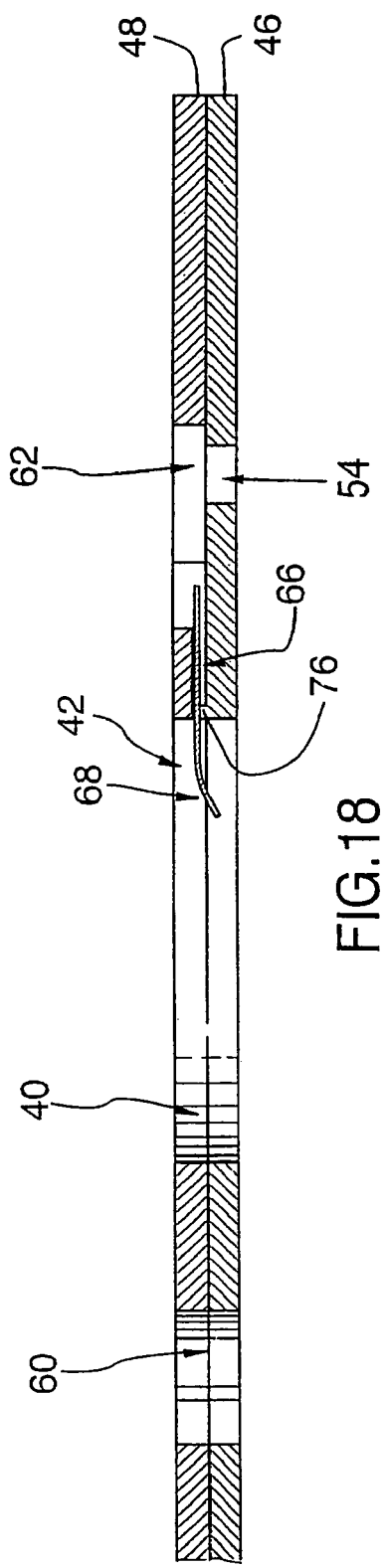
FIG. 17
FIG. 18

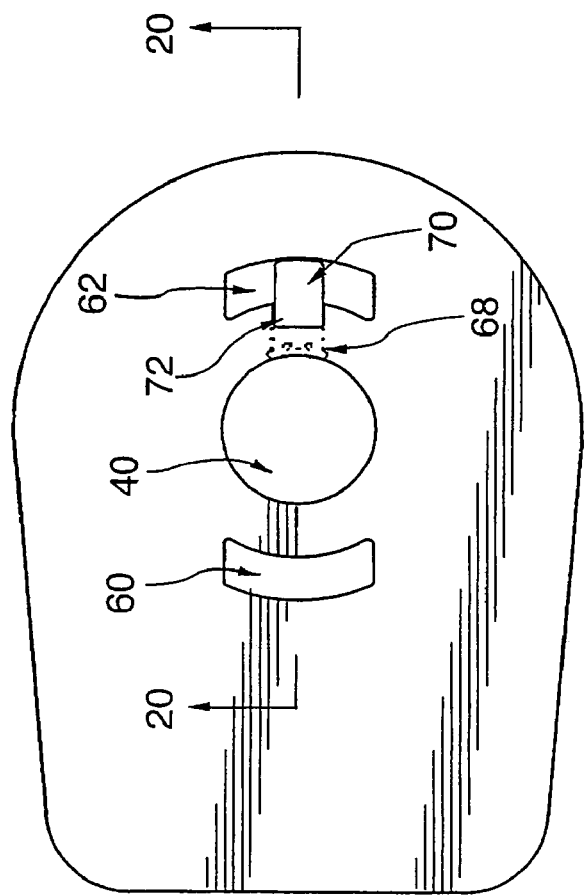
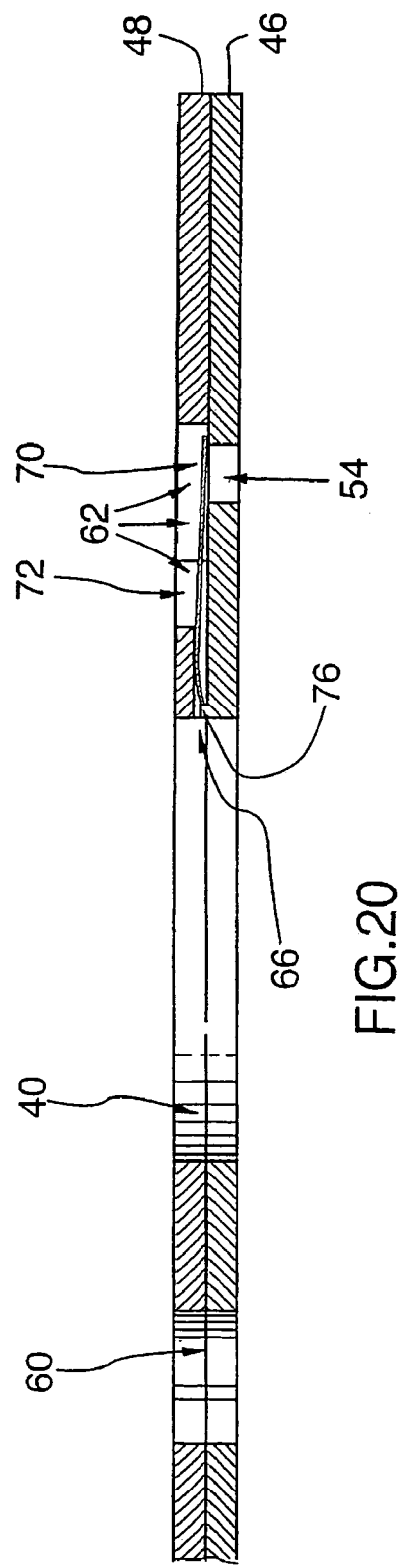
FIG. 19
FIG. 20

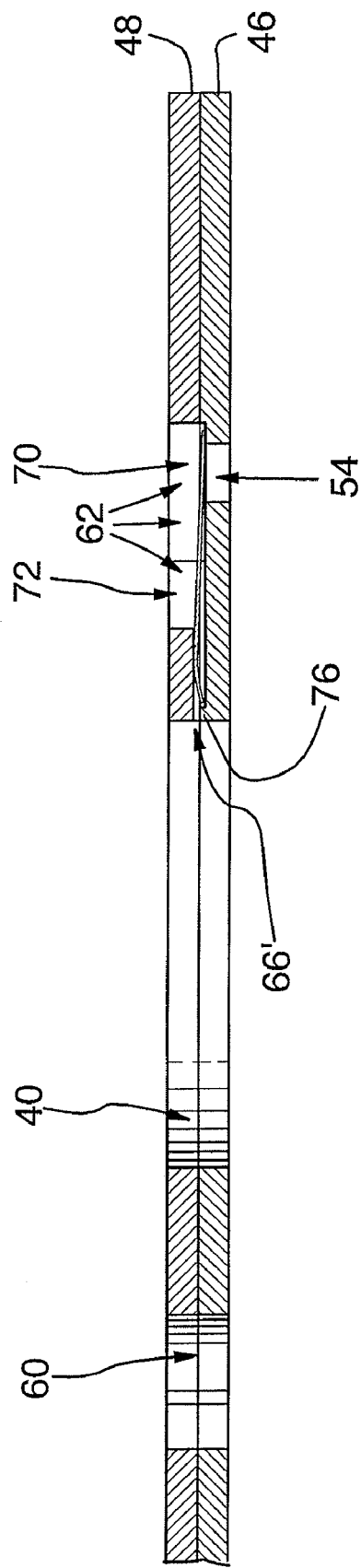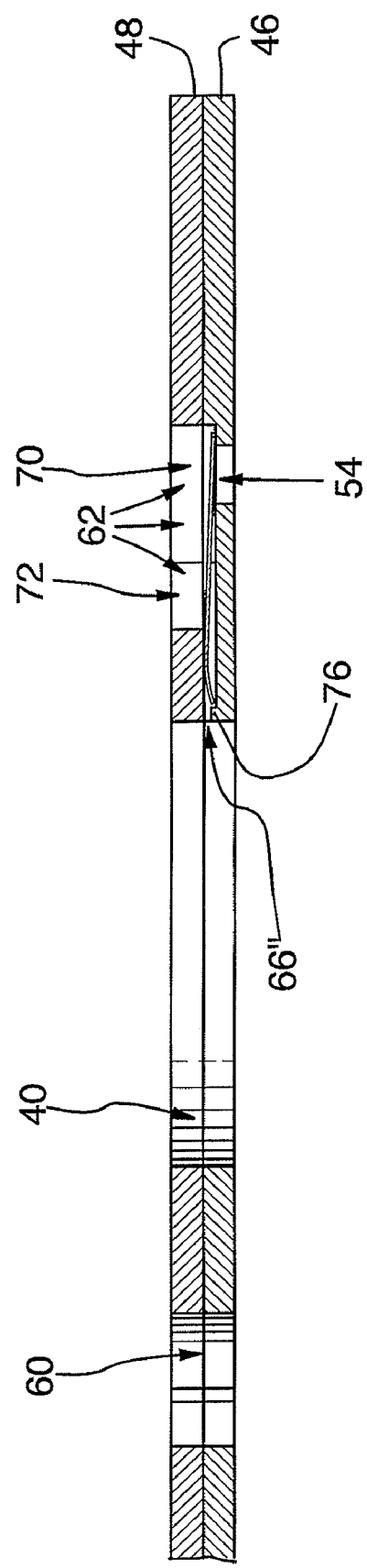

SLIDE-IN FLAPPER VALVES

FIELD OF THE INVENTION

This invention relates to valves, and in particular, to flapper valves.

BACKGROUND OF THE INVENTION

Automotive fluids, such as engine oil or transmission fluids, absorb heat in use. To prevent fluid deterioration, this heat often needs to be removed. Heat exchangers are commonly used for this purpose. Moreover, heat exchangers are known to perform this function adequately in moderate ambient conditions. However, in cold ambient conditions, engine oils and transmission fluids can be highly viscous. In such conditions, automotive fluids can be relatively indisposed to flow through heat exchangers. As a result, in such conditions, the interposition of a heat exchanger in an oil circuit can disadvantageously impede circulation. Starvation of some downstream components, like transmissions, may even occur.

In order to avoid these adverse effects, it is known to provide a mechanism for bypassing the heat exchanger. One way that this has been done in the past is to provide a bypass conduit. The bypass conduit is connected in parallel with the heat exchanger and has a relatively low resistance to the flow of high viscosity fluids as compared to the heat exchanger. Structures of this type are known to avoid starvation of downstream components, but can suffer in that, in normal operating conditions, the flow is split between the heat exchanger and the bypass circuit. This requires that the heat exchangers be made proportionately larger and heavier to achieve the same overall heat exchange performance for the cooling system. This added size and weight, and the added costs associated therewith, are undesirable to automotive manufacturers.

To ameliorate the split-flow problem, it is known in the prior art to provide bypass valves. Sometimes, these bypass valves are pressure-activated, and are built into the heat exchanger. A heat exchanger exemplary of the foregoing is shown in U.S. Pat. No. 5,499,675 (Haasch, et al.), issued Mar. 19, 1996. This structure includes a flapper valve of spring steel biased in a closed position, to prevent bypass flow, and which is adapted to be urged open when the fluid pressure inside the heat exchanger exceeds a certain limit, as indicative of cold-start conditions. Heat exchangers of this general type can avoid starvation of downstream lubricated components, and can be adapted such that bypass flow is substantially nil in normal operating conditions, thereby to permit compact heat exchanger construction. However, in Haasch et al, the flapper valve is rather delicate and exposed while the heat exchanger is being mounted to the engine block, using an extension of the oil return pipe. The flapper valve is prone to suffering damage or being dislodged during installation. Also, heat exchangers of this type cannot be modified easily to accommodate different mounting or performance requirements in modern automotive applications. It is also known to provide heat exchangers including a domed filter plate and a snap-in valve clip. Structures of this type are described in U.S. Pat. No. 4,561,494 (Frost), issued Dec. 31, 1985; U.S. Pat. No. 5,588,485 (Gire), issued Dec. 31, 1996; and U.S. Pat. No. 5,765;632 (Gire), issued Jun. 16, 1998. While the flapper valves in these structures are less prone to damage or dislodgement during heat exchanger installation, these heat exchangers are relatively inflexible in terms of the location of the bypass apertures or the size or shape of the oil filter that can be used with them.

SUMMARY OF THE INVENTION

In the present invention, a compact, low-profile flapper valve assembly is provided. The flapper valve assembly utilizes a slide-in flapper valve, and can be readily attached to any heat exchanger or other fluid device having a flow chamber communicating with the flapper valve assembly. The flapper valve assembly provides for selective flow from the flow chamber, and can be conveniently configured to accommodate different mounting or performance requirements in modern automotive applications.

According to one aspect of the invention, there is provided a flapper valve assembly for use with a fluid device having a flow chamber. The flapper valve assembly comprises a shim plate having a fluid port therethrough for communication with the flow chamber. A face plate overlies the shim plate and has an outlet port communicating with said fluid port. The shim plate and the face plate define a slot located between the shim plate and the face plate. The slot extends between one of the fluid and outlet ports and the periphery of at least one of the shim plate and the face plate. A flapper valve has a first portion slidably located in the slot, and a flexible second portion movable from a first position where the second portion at least partially blocks flow through the fluid port, to a second position where the second portion unblocks flow through the fluid port. Flapper gripping means are provided for locking the first portion against movement in the slot. Bias means are provided for urging the second portion into the first position.

According to another aspect of the invention there is provided a heat exchanger for use with a lubrication circuit for mechanical components and with a spin-on oil filter. The heat exchanger comprises a heat exchange element and a flapper valve assembly. The heat exchange element includes an inlet manifold. The flapper valve assembly includes a shim plate attached to the heat exchange element, the shim plate having a fluid port therethrough communicating with the inlet manifold. A face plate overlies the shim plate and has an outlet port communicating with the fluid port. The face plate also has a sealing surface adapted to be engaged by the filter for delivering oil to the filter from the outlet port. The shim plate and the face plate define a slot located between the shim plate and the face plate. The slot extends between one of the fluid and outlet ports and the periphery of at least one of the shim plate and the face plate. A flapper valve has a first portion slidably located in the slot, and a flexible second portion movable from a first position where the second portion at least partially blocks flow through the fluid port, to a second position where the second portion unblocks flow through the fluid port. Flapper gripping means are provided for locking the first portion against movement in the slot. Bias means are provided for urging the second portion into the first position.

Advantages, features and characteristics of the present invention, as well as methods of operation and functions of the related elements of the structure, and the combination of parts and economies of manufacture, will become apparent upon consideration of the following detailed description of the preferred embodiments, with reference to the accompanying drawings, the latter of which is briefly described hereinafter.

BRIEF DESCRIPTION OF THE DRAWINGS

In the accompanying drawings, which are for the purpose of illustration and description only, and are not intended as a definition of the limits of the invention:

FIG. 8 is a partial cross-sectional view taken along lines 8-8 of FIG. 7, with the second portion of the flapper valve disposed at a closed position;

FIG. 8A is a view similar to FIG. 8, with the second portion of the flapper valve disposed at an open position;

FIG. 9 is a partial cross-sectional view taken along lines 9-9 of FIG. 7;

FIG. 10 is a view similar to FIG. 7, with the flapper valve about to be inserted into the heat exchanger;

FIG. 11 is a partial cross-sectional view taken along lines 11-11 of FIG. 10;

FIG. 15 is a view similar to FIGS. 10, 12 and 14, but showing a further preferred embodiment of the invention;

FIG. 16 is a partial cross-sectional view taken along lines 16-16 of FIG. 15;

FIG. 17 is a view similar to FIG. 15, but with the flapper valve partially inserted into the heat exchanger;

FIG. 18 is a partial cross-sectional view taken along lines 18-18 of FIG. 17;

FIG. 19 is a view similar to FIGS. 15 and 17, but with the flapper valve fully inserted into the heat exchanger;

FIG. 20 is a partial cross-sectional view taken along lines 20-20 of FIG. 19;

FIG. 23 is a view similar to FIG. 20, but showing the flapper valve slot formed partially in both the shim plate and the face plate; and FIG. 24 is a view similar to FIG. 20, but showing the flapper valve slot formed in the shim plate.

DESCRIPTION OF THE PREFERRED EMBODIMENTS

Figure 1:
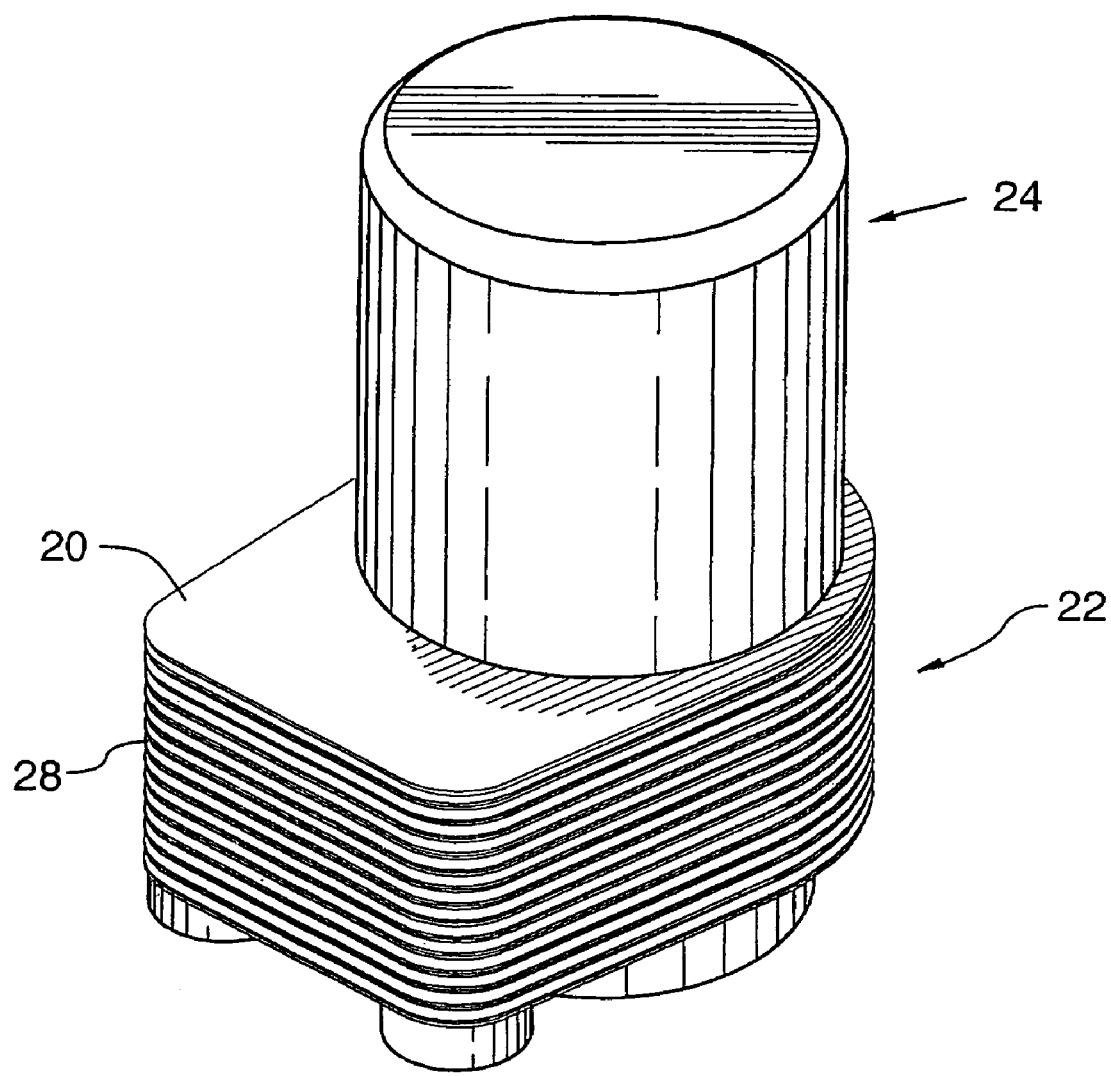
FIG. 1 is a perspective view of an assembly including a heat exchanger and a spin-on oil filter, the heat exchanger including a flapper valve assembly according to a preferred embodiment of the present invention.

FIG. 1 shows a heat exchanger 22 having a spin-on oil filter 24 or similar fluid device mounted thereon. Heat exchanger 22 includes a flapper valve assembly 20 according to a preferred embodiment of the present invention, and a heat exchanger element 28. Heat exchanger 22 preferably is in the form of donut-type oil cooler, but it could be any other type of heat exchanger or any other type of fluid device. For the purposes of the present specification, the exact form of the heat exchanger element 28 and the spin-on oil filter 24 is not considered to be part of the present invention.

Figure 2:
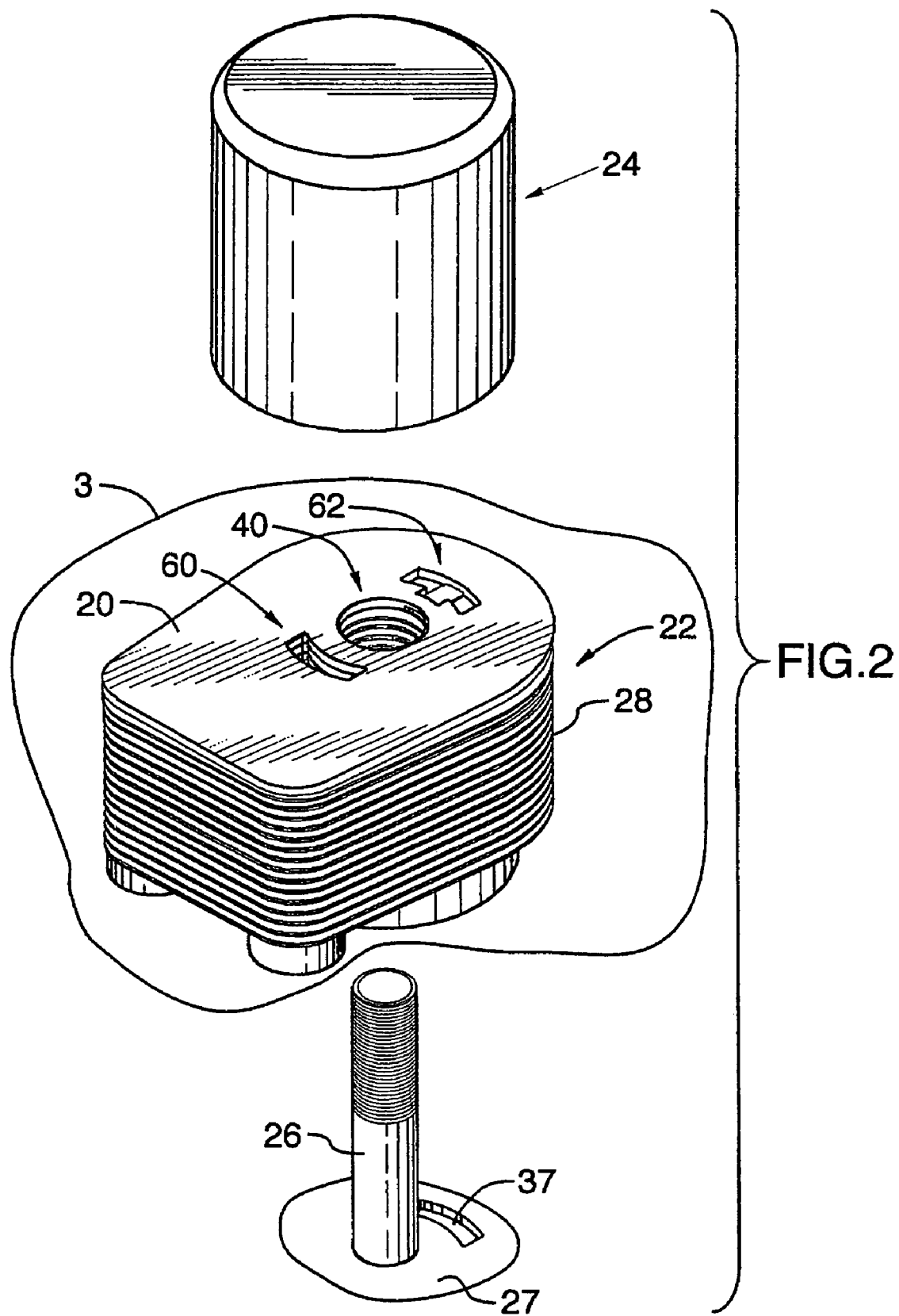
FIG. 2 is an exploded view of the structure of FIG. 1.

The heat exchanger or donut-type cooler 22 is for use with a coolant circuit and a lubrication circuit for mechanical components and, by way of example, as indicated in FIG. 2, is mounted on a threaded tube or pipe 26 attached to an engine block, 27 (only partially shown). Threaded pipe 26 extends through a clearance opening or hole 40 in heat exchanger 22 to permit the subsequent threaded attachment of the oil filter 24 onto pipe 26, as indicated in FIG. 1, and also to hold heat exchanger 22 in place on engine block 27.

Figure 3:
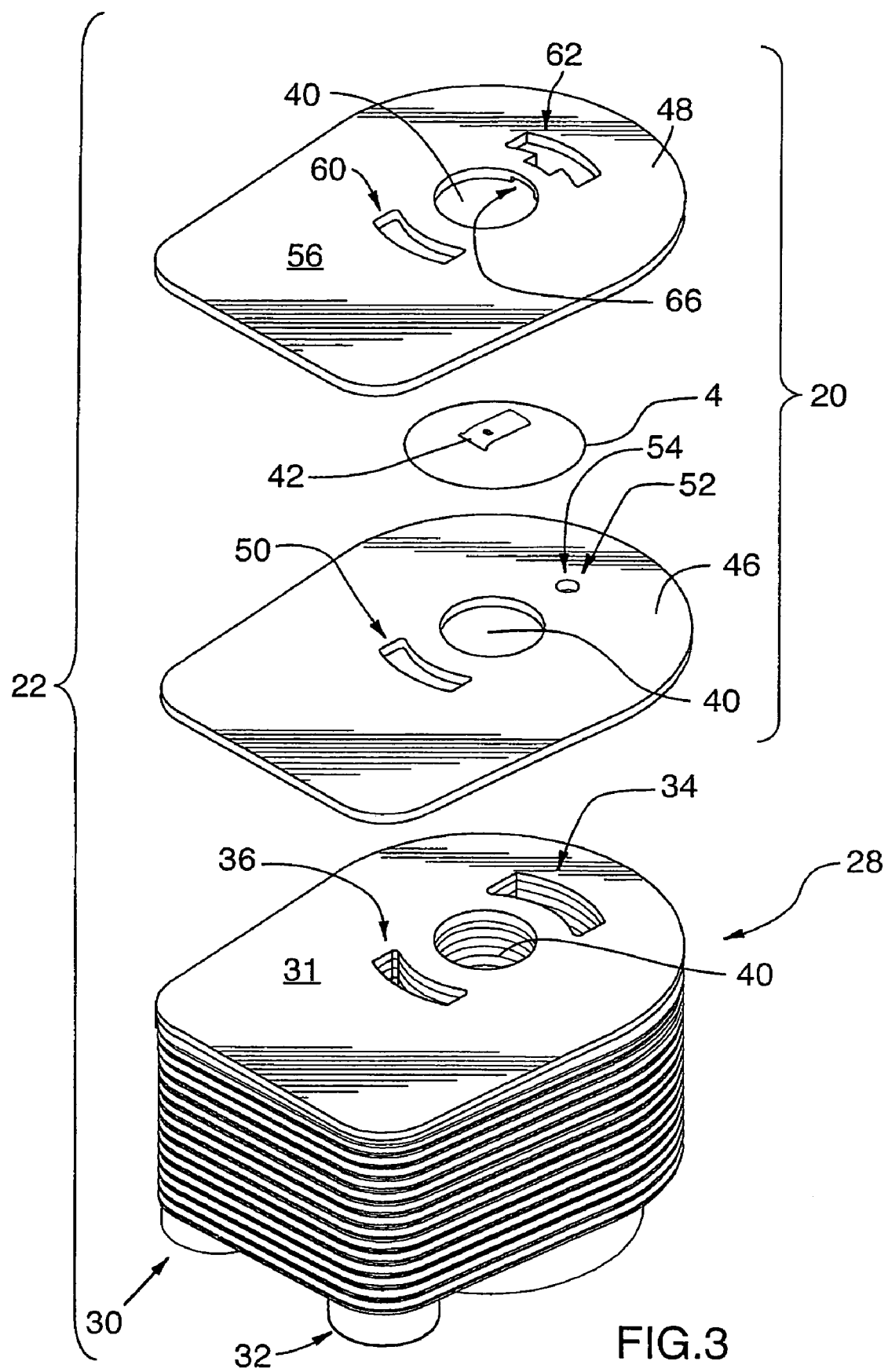
FIG. 3 is an exploded view of the structure in encircled area 3 in FIG. 2.

As best seen in FIG. 3, heat exchange element 28 has an end plate 31, to which flapper valve assembly 20 is attached. Heat exchange element 28 is of the stacked-plate type and has a coolant inlet 30 and a coolant outlet 32. Heat exchange element 28 is formed of a plurality of aluminum plates brazed together. Each plate has spaced apart, arcuate openings therein, which are aligned to form respective flow passages or chambers or manifolds 34, 36. One of these manifolds can be an inlet manifold, for example, manifold 34. The other of them can be an outlet manifold 36, but this flow direction could be reversed.

Where flow chamber or manifold 34 is the inlet manifold, oil is received into the manifold 34 through an aperture 37 formed in engine block 27 (see FIG. 2). This oil passes through heat exchange element 28 to outlet manifold 36, and then passes upwardly into oil filter 24, and finally down through pipe 26 to be returned to engine block 27. However, where this flow is reversed, (hereafter referred to as the reverse flow direction), it comes up through pipe 26 to filter 24, and then passes through manifold 36 to manifold 34 and then goes back through aperture 37 to be returned to the engine. In this latter case, manifold 36 would be the inlet manifold and manifold 34 would be the outlet manifold of heat exchange element 28.

It should be understood that the heat exchange element 28 is of generally conventional construction, and therefore, only those parts necessary for an understanding of the present invention are shown in the figures and described herein.

Upon a flow of heated oil being forced into the inlet manifold 34 and a flow of coolant being delivered to the coolant inlet 30, a flow of cooled oil is produced at the outlet manifold 36 and a flow of heated coolant is produced at the coolant outlet 32.

Flapper valve assembly 20 has a shim plate 46 and an overlying face plate 48 secured to one another and together defining part of clearance opening 40 adapted for receiving the threaded pipe 26.

The shim plate 46, which is stamped from an aluminum alloy and secured, by brazing, to end plate 31 of heat exchange element 28, is provided with an aperture 50 and a passage-forming portion 52. Aperture 50 is in communication with the outlet manifold 36. The passage-forming portion 52 defines a fluid passage or port 54 in communication with the inlet manifold 34 and spaced from the clearance opening or hole 40. For greater clarity, it should be understood that the passage-forming portion 52 in this embodiment is a generally annular portion of the shim plate 46 immediately surrounding the fluid port 54.

Figure 21:
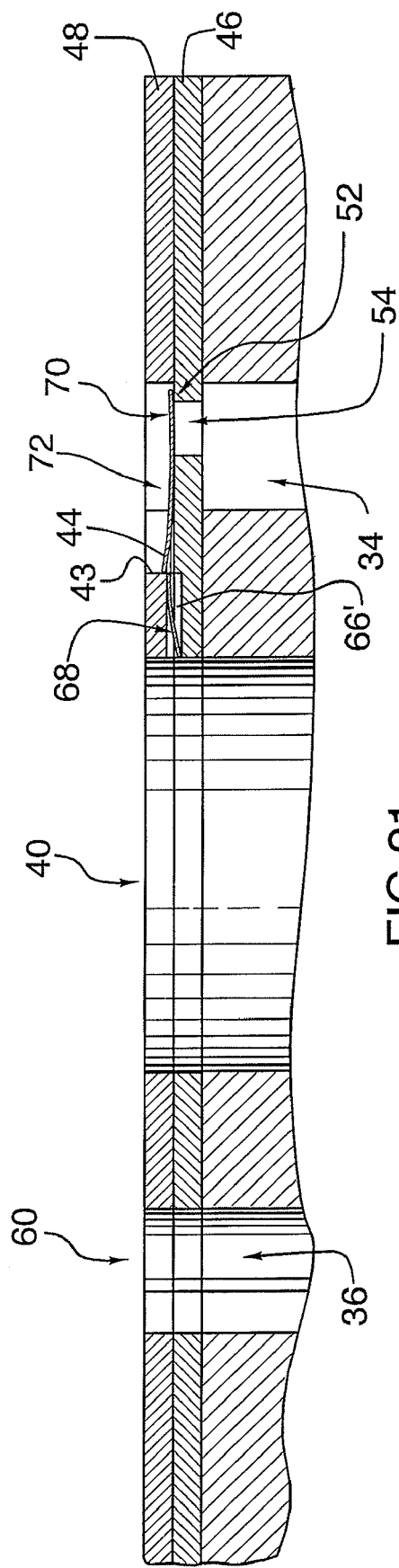
FIG. 21 is a view similar to FIG. 8, but showing the flapper valve slot formed partially in both the shim plate and the face plate.
Figure 22:
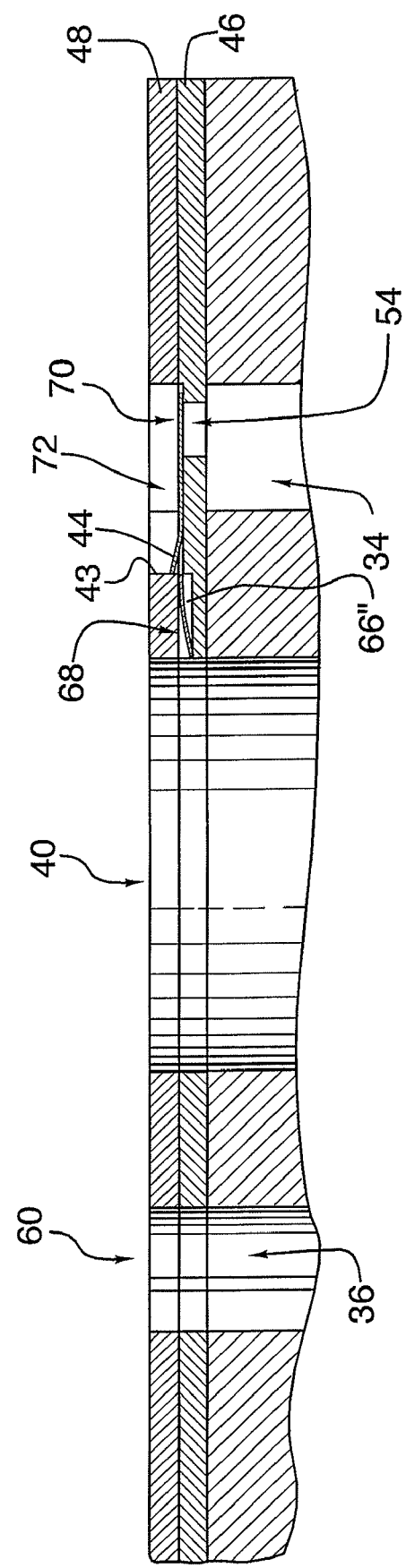
FIG. 22 is a view similar to FIG. 8, but showing the flapper valve slot formed in the shim plate.

The face plate 48, which is formed of aluminum and secured by brazing to shim plate 46, has a sealing surface 56 adapted to be engaged by the filter 24. Face plate 48 has a pair of fluid outlet ports 60, 62 (or inlet ports where the flow direction is reversed, as discussed above) for delivering oil to filter 24. One outlet port 60 is in communication with the aperture 50, thereby to communicate with the outlet manifold 36. The other outlet port 62 communicates with fluid port 54. Shim plate 46 and face plate 48 define therebetween a slot 66 machined into the underside of the face plate 48. Slot 66 extends between the outlet port 62 and the periphery of at least one of the shim plate 46 and the face plate 48. For example, in the embodiment shown in FIG. 3, slot 66 extends radially inwardly to the periphery of clearance opening 40, which is also at the inner periphery of both the respective shim and face plates 46, 48. However, slot 66 could extend radially outwardly in the opposite direction from the outlet port 62 to the outside peripheral edges of the shim and face plates 46, 48, if desired. Slot 66 could be formed in shim plate 46 instead of face plate 48, as indicated by slots 66" in FIGS. 22 and 24, or it could be formed partially in both the shim and face plates 46, 48 as indicated by slots 66' in FIGS. 21 and 23. In these latter configurations, appropriate modifications of the outlet port 62 and fluid port 54 would be required to accommodate the positioning of flapper valve 42, as will be appreciated by those skilled in the art. Also, where slot 66 extends to the outside peripheral edges of the shim and face plates 46, 48, the outside peripheral edges would need to be sealed to prevent leakage from the heat exchange element through slot 66. As it is, some leakage from slot 66 into clearance opening 40 could occur if slot 66 is not completely blocked by pipe 26, but this leakage would be insignificant.

Figure 4:
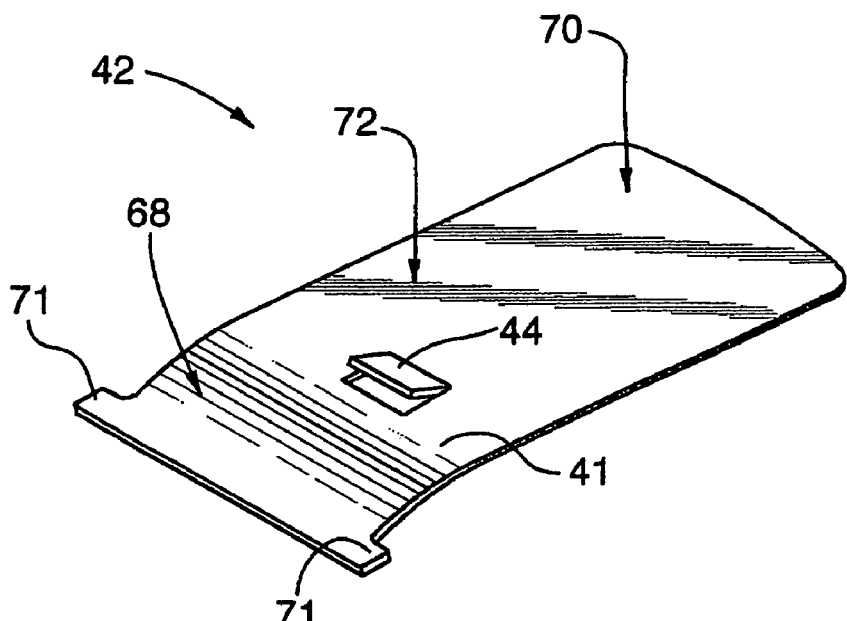
FIG. 4 is an enlarged perspective view of the flapper valve as indicated in encircled area 4 in FIG. 3.
Figure 5:
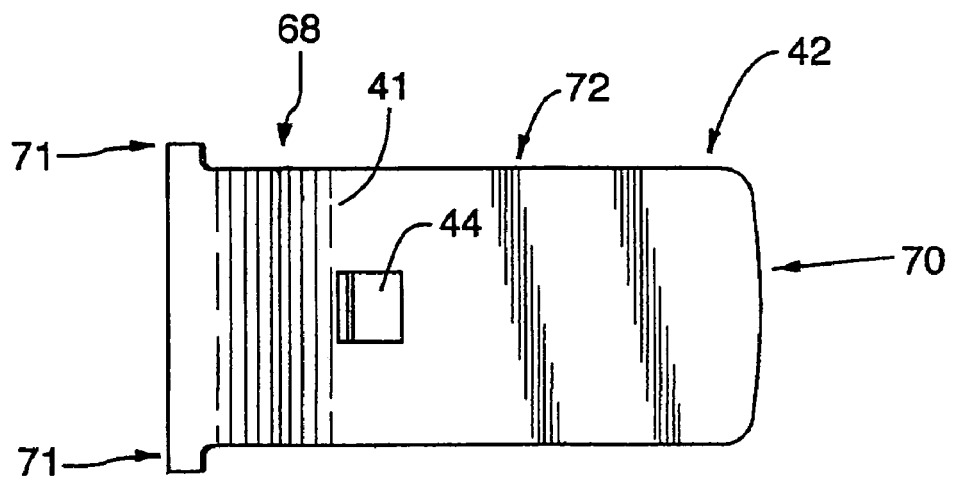
FIG. 5 is a top plan view of the structure of FIG. 4.

The flapper valve assembly 20 further includes a flexible, resilient flapper or flapper valve 42. As seen best in FIGS. 4 to 6, flapper valve 42 is constructed out of a bowed strip of resilient spring material, namely, spring steel. Flapper valve 42 has a first portion 68, a second portion 70 and an intermediate portion 72 extending between the first portion 68 and the second portion 70. The first portion 68 is slidably located in slot 66 in an operative position within slot 66. While the first and intermediate portions 68, 72 could be relatively rigid, second portion 70 is flexible to act as a valve, as discussed below.

At the operative position of the first portion 68, the second portion 70 is movable, by flexure, between a first or closed position, abutting the passage-forming portion 52, to at least partially block flow through the fluid port 54, as shown in FIG. 8, to a second or open position, spaced from the passage-forming portion 52, as shown in FIG. 8A, where flow through fluid port 54 is unblocked. The second portion 70 is dimensioned to restrict flow through the fluid port 54, either fully or partially, when disposed at its first or closed position.

Outlet port 62 in mounting or face plate 48 is dimensioned to be a clearance opening to permit full movement of the flapper valve second portion 70 to the second or open position. However, the peripheral edges of outlet port 62 could be configured to overlap and limit the opening of flapper valve 42, if desired.

Figure 6:
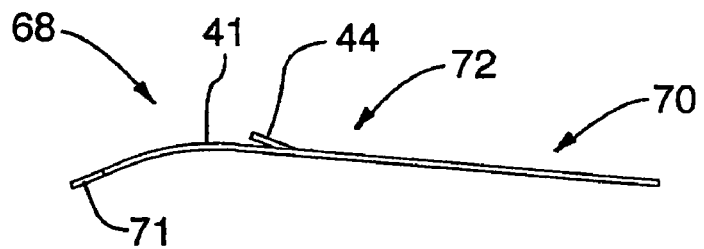
FIG. 6 is a side elevational view of the structure of FIG. 4.
Figure 7:
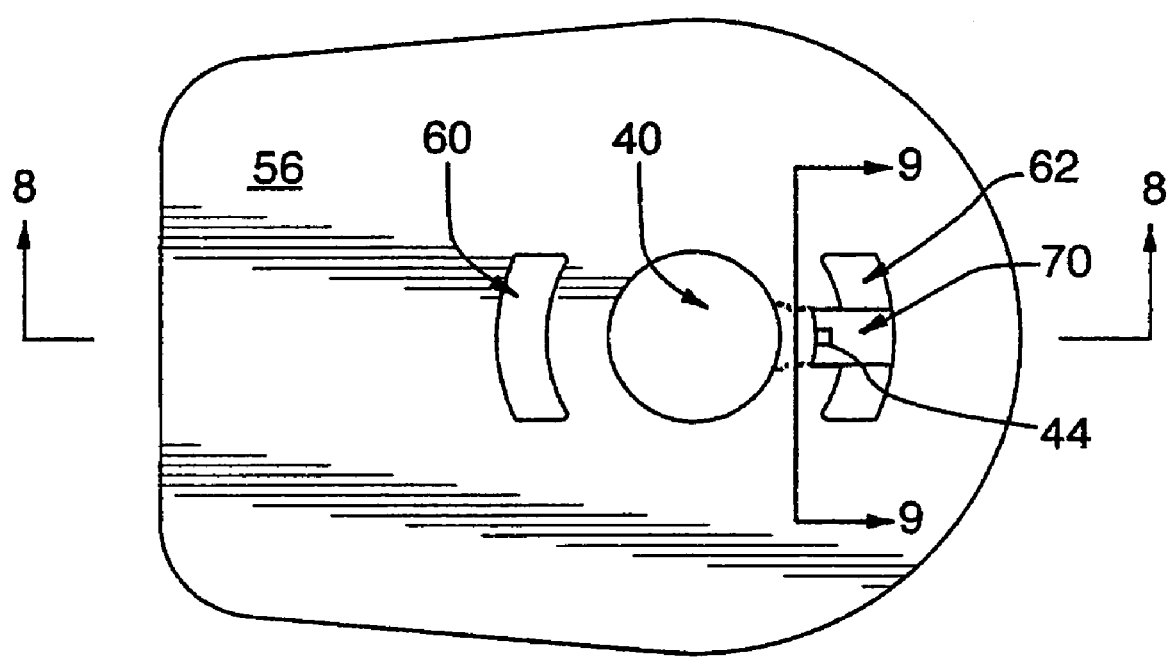
FIG. 7 is a top plan view of the heat exchanger as indicated in encircled area 3 in FIG. 2.
Figure 12:
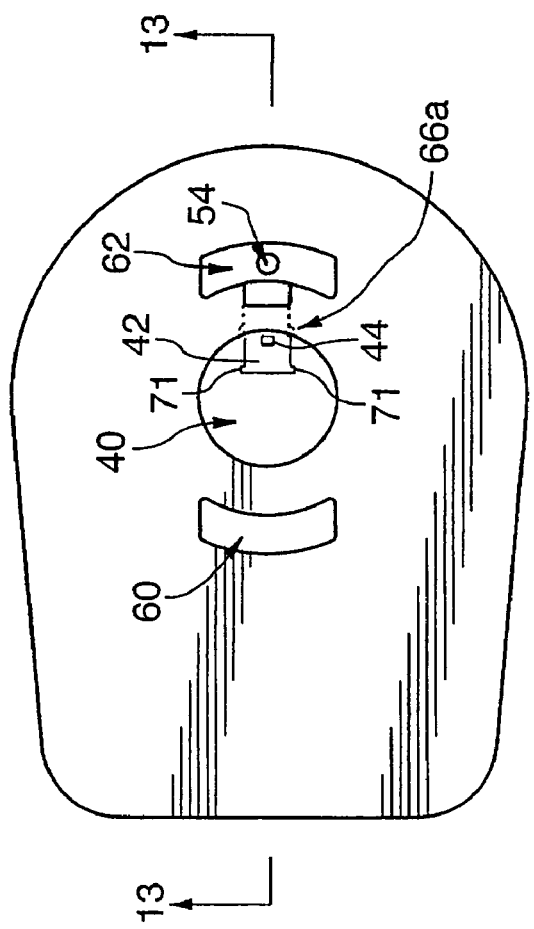
FIG. 12 is a view similar to FIG. 10, but with the flapper valve partially inserted into the heat exchanger.
Figure 13:
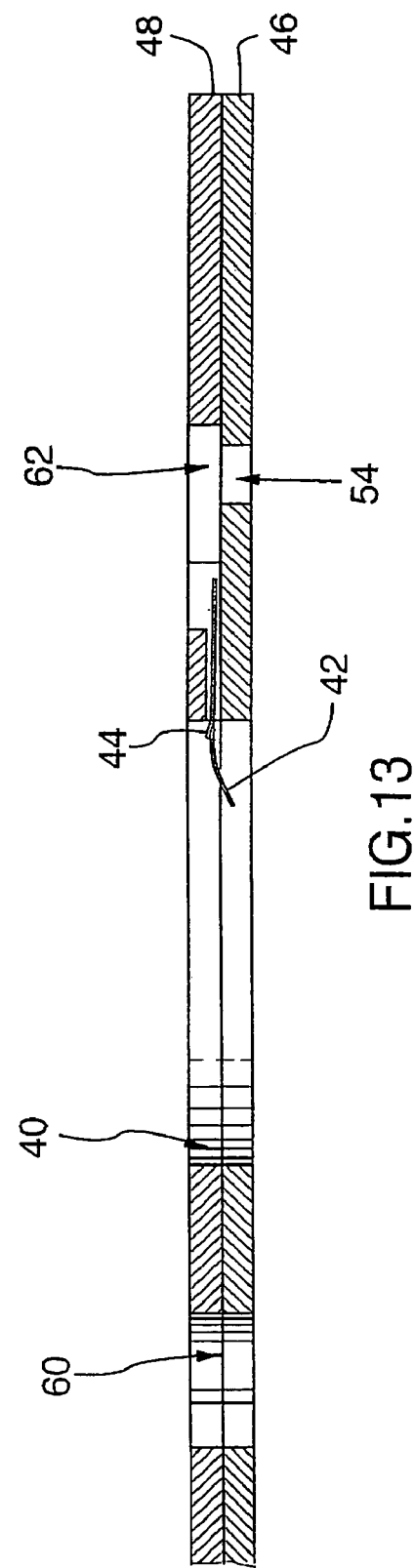
FIG. 13 is a partial cross-sectional view taken along lines 13-13 of FIG. 12.
Figure 14:
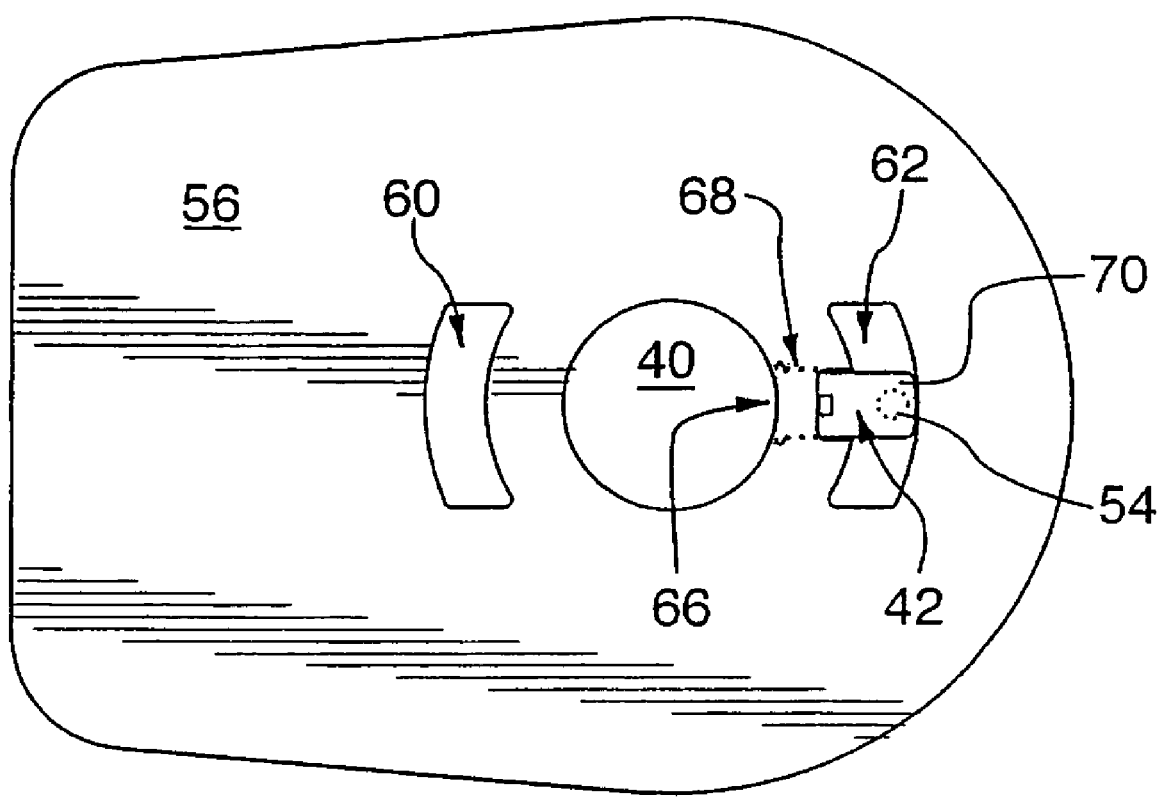
FIG. 14 is a view similar to FIGS. 10 and 12, but with the flapper valve fully inserted into the heat exchanger.

As is evident from a comparison of FIGS. 6 and 8, the flapper valve 42 is flattened somewhat to fit into slot 66 in its operative position, and is thereby spring-loaded and frictionally held in slot 66. A crest 41 on the flapper valve 42, (see FIGS. 4 to 6) bears against the underside of the slot 66, adjacent to the periphery of fluid port 62. In this preferred embodiment, the slot 66 and the clearance opening 40 are adapted to permit the first portion 68 to be operatively positioned by firstly inserting the flapper valve second portion 70 through the clearance opening 40 into the slot 66, as indicated by the sequence of FIGS. 10 to 14. Arrow 74 in FIG. 10 shows the direction of insertion. The first portion 68 is flared so as to define at least one and preferably two opposed transverse protuberances 71, best seen in FIGS. 4 and 5, which engage corresponding notches 66a in slot 66, as seen best in FIG. 12, when the first portion 68 is operatively positioned, thereby to correctly position and align flapper valve 42 in slot 66 and avoid over-insertion of flapper valve 42. Protuberances 71 could be perpendicular to first portion 68, if desired, in which case notches 66a would be modified accordingly.

Flapper valve 42 also includes a staked tab 44 formed in or adjacent to crest 41 to engage the peripheral edge 43 (see FIG. 8) of outlet port 62 in face plate 48, and lock the flapper valve 42 against extraction from the slot 66. The friction fit of flapper valve 42 in slot 66, as well as protuberances 71 and tab 44 form flapper gripping means for locking the flapper first portion 68 against movement in slot 66. The spring flapper valve also constitutes bias means for urging the flapper valve second portion 70 into the second or closed position.

In a further preferred embodiment, shown in FIGS. 15 to 20, otherwise substantially identical to the preferred embodiment illustrated in FIGS. 1-14 and numbered commonly, the flapper gripping means includes a detent 76 positioned within the slot 66, instead of a staked tab 44. Detent 76 is adapted to bear against the first portion 68 of the flapper valve 42 when operatively positioned, to correctly position flapper valve 42 in slot 66 and lock same against extraction from the slot 66. The detent 76 in this embodiment is an upturned tab or flange formed in shim plate 46. As best illustrated in FIG. 15, the first portion 68 is provided with a cut-out 78, in which detent 76 sits when the first portion 68 is operatively positioned. Such a cut-out 78 provides a pair of spaced legs 80, which may be utilized to urge the flapper valve 42 into position. As best illustrated in the sequence of FIGS. 15 to 20, the flapper valve 42 of this further preferred embodiment rides in slot 66 over the detent 76 during insertion. Once first portion 68 reaches the operative position, bias provided by the intermediate portion 72 urges the first portion 68 against the lower wall defining slot 66, such that flapper valve 42 snaps into position and the detent 76 nests into the cut-out 78.

In normal operating conditions, wherein relatively warm, substantially free-flowing oil is delivered to the inlet manifold 34, the flow resistance through donut cooler 22 is relatively low, such that the bias provided by the intermediate portion 72 maintains the second portion 70 of the flapper valve 42 against the passage-forming portion 52 to restrict, and more specifically, substantially arrest flow through the fluid port 54. Thus, most of the flow arriving at the inlet manifold 34 passes through the heat exchange element 28 to the outlet manifold 36, transferring heat in the process, prior to passing through fluid port 60 in the face plate 48 to the oil filter 24, for filtration and subsequent return to the oil circuit in a conventional manner.

In contrast, in normal high-pressure transient conditions, such as are present in the context of an engine start in relatively cold ambient conditions, wherein the oil is relatively cold, viscous oil is delivered to the inlet manifold 34 and the pressure in manifold 34 is relatively high. As a result, the viscous oil forces the second portion 70 of the flapper valve 42 to the open position, spaced from the passage-forming portion 52, as indicated by the sequence of FIGS. 8,8A, such that sufficient by-pass flow passes from the inlet manifold 34 to port 62 directly to the filter 24, through the fluid port 54. Periodic, momentary burst flows caused by high-pressure spikes in the oil circuit also bypass the heat exchange element 28 in this manner.

The mechanical properties of the flapper valve 42 are selected to suit the operating parameters of the heat exchange element and lubrication circuit with which it is used, and in particular, flapper valve 42 has a spring constant such that it will open under predetermined pressure conditions.

The foregoing structure is of particular advantage, in that it obtains relatively high cooling performance in normal operating conditions, when cooling is needed, as substantially all the oil passes through the heat exchange element.

At the same time, the structure avoids starvation of mechanical components in normal transient high pressure conditions, such as cold weather startup, and also avoids metal fatigue that can result from pressure spikes in the thin-wall plates forming the heat exchange element or oil cooler, since in such conditions bypass flow occurs.

Having described preferred embodiments of the present invention, it will be appreciated that various modifications may be made to the structures described above without departing from the spirit or scope of the invention.

Foremost, whereas the flapper valve assembly of the present invention is shown attached to a heat exchanger in each of the preferred embodiments illustrated, it should be understood that the invention is not so limited, and may be deployed in association with any fluid device having a flow chamber from which intermittent bypass flow is desired.

It should also be understood that whereas the disclosure illustrates and describes a heat exchanger of specific construction, modifications therein are also contemplated to fall within the scope of the invention. Heat exchangers, for example, that are not of the donut type may be utilized.

As well, the heat exchangers need not be formed of stacked plates, nor is it required that the various components be brazed to one another.

Where the heat exchanger is used with an oil filter and the flow direction is reversed, i.e., where the oil goes through the oil filter first and then the heat exchanger, flapper valve assembly 20 would be positioned upside down, so that the flapper valve second portion opens downwardly toward manifold 34.

It will also be appreciate that the flapper valve could be inserted into the valve assembly 20 by inserting it first through outlet port 62 and then into slot 66. In this case, the flapper valve second portion 70 could be made larger, as could the bypass fluid port 54. Appropriate modifications would be made to the structure described above for retaining the flapper valve in position.

As a further modification, whereas the flapper valve of the preferred embodiment consists of a strip of simple spring steel, a resilient bimetallic strip could be readily substituted therefor. For example, a bimetallic flapper valve could open in cold conditions to give bypass flow even if the pressure was not excessive, and close in warm conditions to give pressure relief as needed. Of course, a bimetallic flapper valve would still have a flexible second portion and provide pressure spike protection even in warm flow conditions.

As well, whereas in the preferred embodiments illustrated, the flapper valve is adapted to substantially arrest flow when the second portion thereof is disposed at its closed position, this need not be the case. The second portion could, for example, be sized to only partially cover the fluid passage, thereby to permit a measure of bypass flow at all times.

From the foregoing, it will be evident to persons of ordinary skill in the art that the scope of the present invention is limited only by the accompanying claims, purposively construed.

The invention claimed is:

1. A flapper valve assembly for use with a fluid device having a flow chamber from which intermittent flow is desired, the flapper valve assembly comprising:
    a shim plate having a fluid port therethrough for communication with said flow chamber;
    a face plate overlying the shim plate and having an outlet port communicating with said fluid port;
    the shim plate and the face plate defining a slot located between the shim plate and the face plate, the slot extending between one of the fluid and outlet ports and the periphery of at least one of the shim plate and the face plate;
    a flapper valve having a first portion slidably located in said slot, and a flexible second portion movable from a first position where the second portion at least partially blocks flow through the fluid port, to a second position where the second portion unblocks flow through the fluid port;
    flapper gripping means for locking the first portion against movement in the slot; and
    bias means for urging the second portion into the first position
    wherein the slot is located in the face plate and is dimensioned to permit the flapper valve first portion to be operatively positioned in the slot by firstly inserting the flapper valve second portion into the slot.

2. A flapper valve assembly according to claim 1 wherein the face plate outlet port is dimensioned to be a clearance opening to permit full movement of the flapper valve second portion to the second position.

3. A flapper valve assembly for use with a fluid device having a flow chamber from which intermittent flow is desired, the flapper valve assembly comprising:
    a shim plate having a fluid port therethrough for communication with said flow chamber;
    a face plate overlying the shim plate and having an outlet port communicating with said fluid port;
    the shim plate and the face plate defining a slot located between the shim plate and the face plate, the slot extending between one of the fluid and outlet ports and the periphery of at least one of the shim plate and the face plate;
    a flapper value having a first portion slidably located in said slot, and a flexible second portion movable from a first position where the second portion at least partially blocks flow through the fluid port, to a second position where the second portion unblocks flow through the fluid port;
    flapper gripping means for locking the first portion against movement in the slot; and
    bias means for urging the second portion into the first position
    wherein the slot is located in the shim plate and is dimensioned to permit the flapper valve first portion to be operatively positioned in the slot by firstly inserting the flapper valve second portion into the slot.

4. A flapper valve assembly according to claim 3 wherein the face plate outlet port is dimensioned to be a clearance opening to permit full movement of the flapper valve second portion to the second position.

5. A flapper valve assembly according to claim 4 wherein the flapper gripping means is the flapper valve being formed into a bowed configuration to be frictionally held in the slot.

6. A flapper valve assembly for use with a fluid device having a flow chamber from which intermittent flow is desired, the flapper valve assembly comprising:
    a shim plate having a fluid port therethrough for communication with said flow chamber;
    a face plate overlying the shim plate and having an outlet port communicating with said fluid port;

the shim plate and the face plate defining a slot located between the shim plate and the face plate, the slot extending between one of the fluid and outlet ports and the periphery of at least one of the shim plate and the face plate;

a flapper valve having a first portion slidably located in said slot, and a flexible second portion movable from a first position where the second portion at least partially blocks flow through the fluid port, to a second position where the second portion unblocks flow through the fluid port;

flapper gripping means for locking the first portion against movement in the slot; and bias means for urging the second portion into the first position wherein the flapper valve first portion has at least one transverse protuberance and the slot includes at least one transverse notch to accommodate the protuberance, the protuberance and notch being located to correctly position the flapper valve in the slot.

7. A flapper valve assembly for use with a fluid device having a flow chamber from which intermittent flow is desired, the flapper valve assembly comprising:

a shim plate having a fluid port therethrough for communication with said flow chamber;

a face plate overlying the shim plate and having an outlet port communicating with said fluid port;

the shim plate and the face plate defining a slot located between the shim plate and the face plate, the slot extending between one of the fluid and outlet ports and the periphery of at least one of the shim plate and the face plate;

a flapper valve having a first portion slidably located in said slot, and a flexible second portion movable from a first position where the second portion at least partially blocks flow through the fluid port, to a second position where the second portion unblocks flow through the fluid port;

flapper gripping means for locking the first portion against movement in the slot; and bias means for urging the second portion into the first position wherein the flapper gripping means includes a staked tab formed in the flapper valve, the tab being located to engage a peripheral edge of the face plate outlet port or the shim plate fluid port to lock the flapper valve against extraction from the slot.

8. A flapper valve assembly according to claim 7 wherein the flapper valve is bowed to form a crest, the staked tab being formed in the bowed crest.

9. A heat exchanger for use with a lubrication circuit for mechanical components and with a spin-on oil filter, said heat exchanger comprising:

a heat exchange element and a flapper valve assembly, the heat exchange element including inlet and outlet manifolds, the flapper valve assembly including:

a shim late attached to the heat exchange element, the shim plate having a fluid port therethrough communicating with the inlet manifold;

a face plate overlying and brazed to the shim plate and having an outlet port communicating with the fluid port, the face plate also having a sealing surface adapted to be engaged by said filter for delivering oil to said filter from said outlet port;

a flapper valve having a first portion and a flexible second portion;

the shim plate and the face plate defining a slot located between the shim plate and the face plate through which the flapper valve can be inserted, the slot extending between one of the fluid and outlet ports and the periphery of at least one of the shim plate and the face plate, the first portion of the flapper valve being slidably located in said slot and the second portion being movable from a first position where the second portion at least partially blocks flow through the fluid port, to a second position where the second portion unblocks flow through the fluid port;

flapper gripping means for locking the first portion against movement in the slot; and bias means for urging the second portion into the first position, wherein the flapper valve assembly includes an aperture for permitting fluid to flow therethrough between the heat exchange element outlet manifold and the oil filter; and wherein the slot is located in the face plate and is dimensioned to permit the flapper valve first portion to be operatively positioned in the slot by firstly inserting the flapper valve second portion into the slot.

10. A heat exchanger for use with a lubrication circuit for mechanical components and with a spin-on oil filter, said heat exchanger comprising: a heat exchange element and a flapper valve assembly, the heat exchange element including inlet and outlet manifolds, the flapper valve assembly including:

a shim plate attached to the heat exchange element, the shim plate having a fluid port therethrough communicating with the inlet manifold;

a face plate overlying the shim plate and having an outlet port communicating with the fluid port, the face plate also having a sealing surface adapted to be engaged by said filter for delivering oil to said filter from said outlet port;

the shim plate and the face plate defining a slot located between the shim plate and the face plate, the slot extending between one of the fluid and outlet ports and the periphery of at least one of the shim plate and the face plate;

a flapper valve having a first portion slidably located in said slot, and a flexible second portion movable from a first position where the second portion at least partially blocks flow through the fluid port, to a second position where the second portion unblocks flow through the fluid port;

flapper gripping means for locking the first portion against movement in the slot; and bias means for urging the second portion into the first position wherein the flapper gripping means includes a staked tab formed in the flapper valve, the tab being located to engage a peripheral edge of the face plate outlet port or the shim plate fluid port to lock the flapper valve against extraction from the slot.

11. A heat exchanger according to claim 10 wherein the flapper valve first portion has at least one transverse protuberance and the slot includes at least one transverse notch to accommodate the protuberance, the protuberance and notch being located to correctly position the flapper valve in the slot.

* * * * *